United States Patent [19]
Ja

[11] Patent Number: 5,740,148
[45] Date of Patent: Apr. 14, 1998

[54] STATIONARY OPTICAL DATA STORAGE SYSTEM USING HOLOGRAPHIC OR ACOUSTO-OPTICAL DEFLECTION

[75] Inventor: Yu Hong Ja, San Jose, Calif.

[73] Assignee: Read-Rite Corporation, Milpitas, Calif.

[21] Appl. No.: 779,463

[22] Filed: Jan. 7, 1997

[51] Int. Cl.$^6$ ............................................... G11B 7/00
[52] U.S. Cl. ................................. 369/112; 369/103
[58] Field of Search ........................... 369/112, 103, 369/109, 44.14, 44.17, 44.18, 114, 14

[56] References Cited

U.S. PATENT DOCUMENTS

| | | | |
|---|---|---|---|
| 4,998,236 | 3/1991 | Henshaw | 369/103 |
| 5,255,262 | 10/1993 | Best et al. | |
| 5,279,775 | 1/1994 | Thomas et al. | 264/1.3 |
| 5,283,773 | 2/1994 | Thomas et al. | 369/44.26 |
| 5,319,629 | 6/1994 | Henshaw et al. | 369/103 |
| 5,420,875 | 5/1995 | Sternklar | 372/9 |

FOREIGN PATENT DOCUMENTS

| | | | |
|---|---|---|---|
| 58-221823 | 12/1983 | Japan | 369/103 |

OTHER PUBLICATIONS

G.T. Sincerbox and G. Rosen, "Opto–Optical Light Deflection", Applied Optics, vol. 22, No. 5 (Mar. 1983), pp. 690–697.

J.P. Herriau, A. Delbouble, J.P. Huignard, G. Rosen, and G. Pauliat, "Optical–Beam Steering for Fiber Array Using Dynamic Holography", IEEE Journal of Lightwave Technology, vol. LT–4, No. 7, (Jul. 1986) pp. 905–907.

"Optical Beam Deflection Using Dynamic Volume Reflection Gratings" in Optical and Quantum Electronics 21 (1989), pp. 151–154, Aug., 1988.

"Scanning Beam Collimation Method for Measuring Dynamic Angle Variations Using an Acousto–optic Deflector", Lijiang Zeng, et al., 1662 Opt. Eng. 35(2) 1662–1663 (Jun. 1996).

"Volume Holographic Memory Systems: Techniques and Architecture", Optical Engineering, Aug. 1995, vol. 34, No. 8, pp. 2193–2203.

*Primary Examiner*—Tan Dinh
*Attorney, Agent, or Firm*—Robert King; Samuel A. Kassatly

[57] ABSTRACT

An optical data storage system for use with a stationary data storage medium includes a stationary optical head for steering an incident laser beam holographically and/or by means of an acousto-optical method along the X and Y direction across the data storage medium. The incident laser beam is selectively reflected by the data storage medium to indicate the type of data bits recorded on the storage medium. In a preferred embodiment the optical head includes a laser source for emitting a collimated laser beam, a beam steering element for steering the laser beam; a beam splitter for deflecting the reflected laser beam; and a photo-detector for detecting the relative intensity of the reflected laser beam for determining the type of recorded data bits. In one embodiment the beam splitting element includes an elasto-optical crystal that causes the impinging laser beam to be deflected in the X and Y directions. In another embodiment the beam splitting element includes a photo-refractive crystal that causes the laser beam to deflect in the X-Y plane by means of holographic techniques.

35 Claims, 6 Drawing Sheets

STATIONARY OPTICAL DATA STORAGE SYSTEM USING HOLOGRAPHIC OR ACOUSTO-OPTICAL DEFLECTION

CROSS REFERENCE TO RELATED APPLICATIONS

The present patent application relates to the following patent applications by the same applicant herein, all of which applications are assigned to the same assignee, and incorporated herein by reference:

Optical and Magneto-Optic Data Storage Systems Utilizing Trasmissive Media, Ser. No. 08/779,461, filed on Jan. 7, 1997.

Stationary Optical Head Using Holographic or Acousto-Optical Deflection, Ser. No. 08/779,462, filed on Jan. 7, 1997.

Transmissive Optical And Magneto-Optical Data Storage Media, Ser. No. 08/779,394, filed on Jan. 7, 1997.

BACKGROUND OF THE INVENTION

1. Field of the Invention

This invention relates generally to optical data storage systems, and in particular to a stationary optical data storage system using holographic or acousto-optical deflection.

2. Description of Related Art

Optical and magneto-optic data storage systems store great quantities of data on a disk. The data is accessed by focusing a laser beam onto the disk and detecting the reflected light beam. Three kinds of systems are well known. The first kind is a ROM (Read Only Memory) system in which data is permanently embedded as marks in the disk. The data is detected as a change in reflectivity as the laser beam impinges on the data marks.

The second kind is a WORM (Write-Once-Read-Many) system that allows the user to write data by making marks, such as pits, on a blank optical disk surface. Once the data is recorded onto the disk it cannot be erased. The data in a WORM system is also detected as a change in reflectivity.

The third kind is a WREM (Write-Read-Erase-Many) system in which a laser beam is used to heat a magneto-optic data layer to a critical temperature, generally just below the Curie temperature, in order to write and erase the data. As the critical temperature is reached, the magnetic domain field strength is reduced to close to zero. An external magnetic field, using an electromagnet or a permanent magnet, is then used to reverse the domain to record a one or a zero. In general data is recorded by orienting the magnetic domain of a spot in either an up or a down position. The WREM system reads the recorded data by directing a low power (reading) laser beam to the data layer. The difference in magnetic domain directions causes the plane of polarization of the light beam to be rotated one way or the other, clockwise or counterclockwise. This change in orientation of polarization is then detected and recognized as either a digit "1" or "0".

U.S. Pat. No. 5,255,262 to Best et al., titled "Multiple Data Surface Optical Data Storage System With Transmissive Data Surfaces", issued on Oct. 19, 1993, which is incorporated herein by reference, describes an optical data storage system that includes a multiple data surface medium and an optical head. The medium includes several substrates that are separated by a light transmissive medium. With the exception of the last data layer, data surfaces are substantially light transmissive and are located on the substrate surfaces which lie adjacent to a light transmissive medium.

The optical head includes an aberration compensator to allow the head to focus onto the different data surfaces, and a filter to screen out unwanted reflected light.

This patented system is relatively complicated and its manufacture is labor intensive. Also, the system uses a focusing mechanism, which adds complexity and cost, and reduces the system signal to noise ratio.

Therefore, there is still a greatly unsatisfied need for an optical system and a magneto-optic data storage system with a reduced number of components, thus simplifying the overall structure and reducing its cost.

SUMMARY OF THE INVENTION

In a preferred embodiment of the present invention, an optical data storage system uses a stationary data storage medium, and includes a stationary optical head for steering an incident laser beam holographically and/or by means of an acousto-optical method along the X and Y direction across the data storage medium. The incident laser beam is selectively reflected by the data storage medium to indicate the type of data bits recorded on the storage medium. In a preferred embodiment the optical head includes a laser source for emitting a collimated laser beam, a beam steering element for steering the laser beam; a beam splitter for deflecting the reflected laser beam; and a photo-detector for detecting the relative intensity of the reflected laser beam and for determining the type of recorded data bits.

In one embodiment the beam splitting element includes an elasto-optical (or elastico-optical) crystal that causes the impinging laser beam to be deflected in the X and Y directions. In another embodiment the beam splitting element includes a photo-refractive crystal that causes the laser beam to deflect in the X-Y plane by means of holographic techniques.

BRIEF DESCRIPTION OF THE DRAWINGS

The features of the present invention and the manner of attaining them, will become apparent, and the invention will be understood by reference to the following description and the accompanying drawings, wherein.

Similar numerals refer to similar elements in the drawings. It should be understood that the sizes of the different components in the figures may not be in exact proportion, and are shown for visual clarity and for the purpose of explanation.

DETAILED DESCRIPTION OF THE INVENTION

Figure 1:
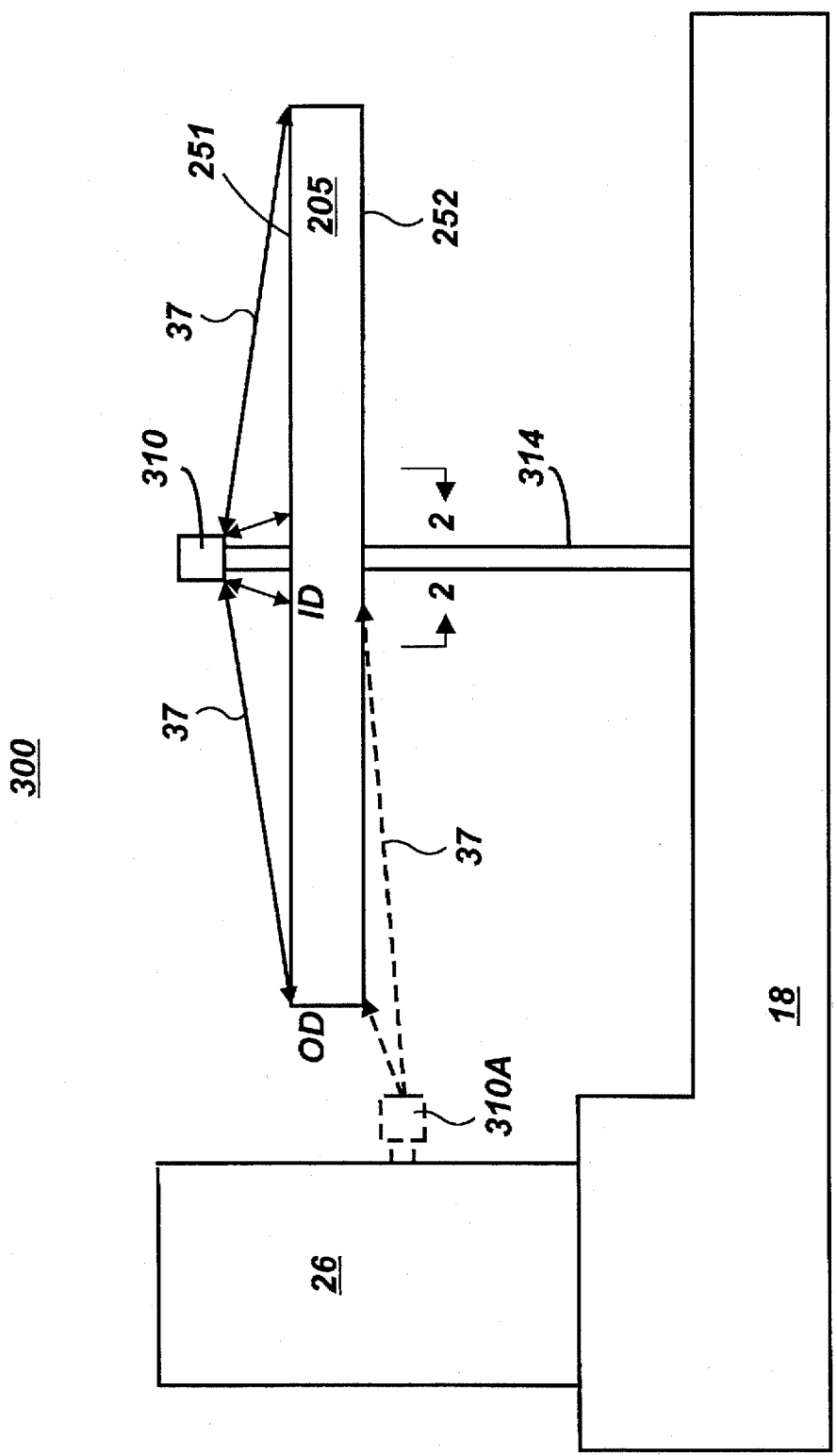
FIG. 1 is a schematic view of an optical data storage system according to the present invention.

FIG. 1 is a schematic view of an optical data storage system 300 according to the present invention. The system 300 includes an optical head 310 and a data storage medium such as a CD ROM disk 205. The disk 205 is removably mounted on an axle 314. The axle 314 is fixedly secured to a chassis 18. In an alternative embodiment the optical head 310 may be connected to a platform 26 secured to the chassis 18 or to any other suitably located support structure.

An important feature of the present invention is that neither the optical head 310 nor the disk 205 move mechanically. Instead, an optical beam, such as a light or laser beam 37 is steered or diffracted by holographic or acousto-optical methods. In addition, since it would be desirable to reduce the overall size of the system 300 so that it has near planar dimensions, the optical head 310 may be positioned as close as possible to the disk 205, such that the angle "$\Theta$" (FIG. 2) formed between the laser beam 37 and a plane parallel to the land (i.e., 220) surface is small (i.e., a few degrees), but is also large enough so that the laser beam 37 is capable of sweeping the entire surface of the disk 205, between its inner diameter track (ID) and its outer diameter track (OD) by steering or diffracting the laser beam 37 by a few degrees. The closer the optical head 310 is to the disk 205, the smaller the steering or diffraction angle becomes.

Figure 2:
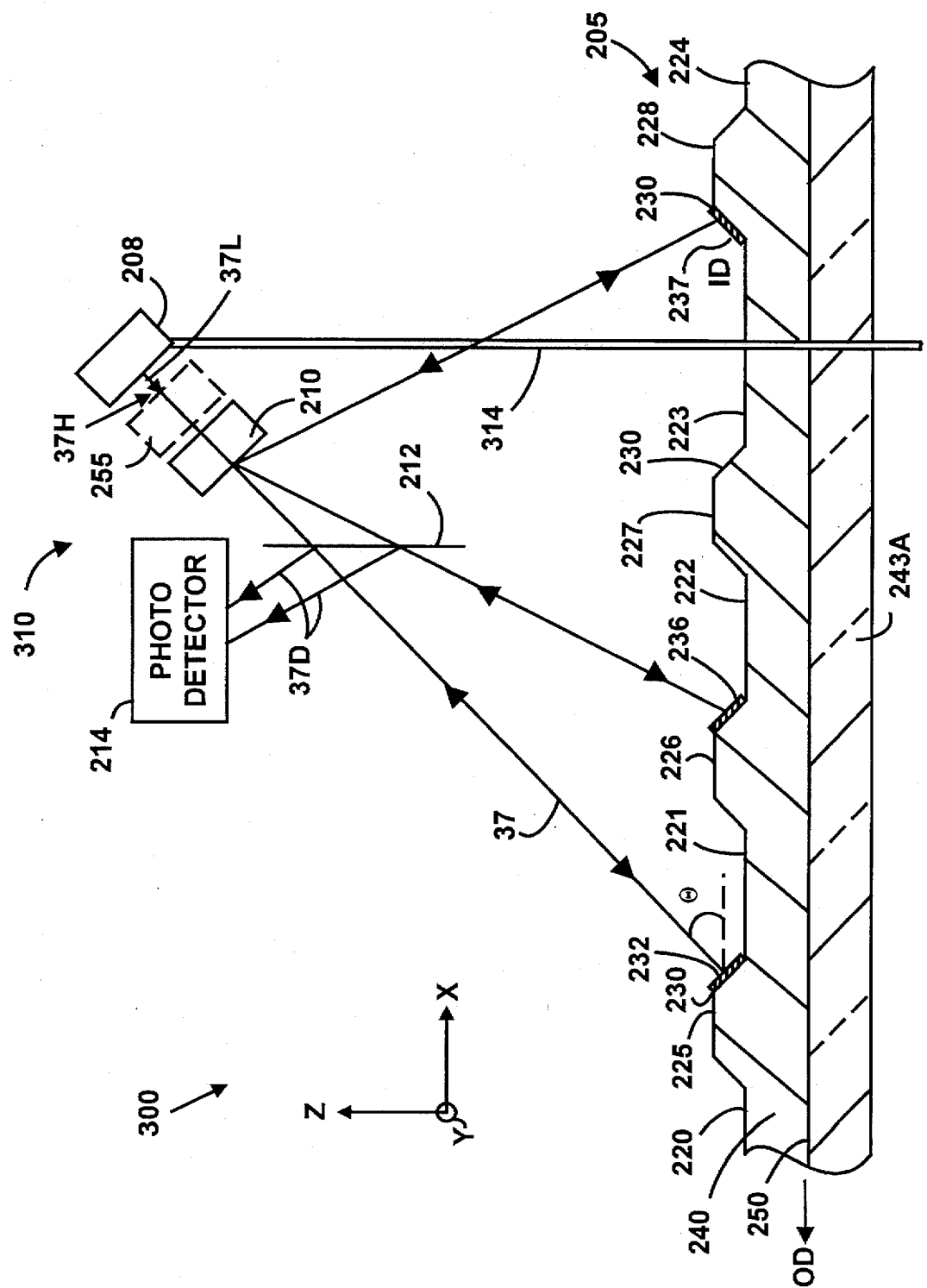
FIG. 2 is an enlarged view of part of the optical data storage system of FIG. 1 showing an exaggerated, detailed, cross-sectional view of a data storage medium used in the optical data storage of FIG. 1 along line 2—2.

With further reference to FIG. 2, the optical head 310 generally includes an optical source such as a laser source 208, a beam steering element 210, a beam splitter 212, and a photo-detector 214. The disk 205 contains a pattern of spiral, or alternatively concentric lands (e.g., 220, 221, 222, 223, 224) and pits (e.g., 225, 226, 227, 228). Each pit is continuous and defines a concentric circle along a track. Similarly, each land is continuous and defines a concentric circle along a track.

Each pit, for instance the pit 225, includes a ridge 230 which is generally normal to an incident laser beam 37. When it is desired to record a data bit, for instance a "1" onto the disk 205, the corresponding ridge 230 is coated with a reflective layer 232. As a result, the absence of the reflective layer 232 on the ridge 230, as is illustrated relative to the pit 227, indicates a "0" data bit.

In a preferred mode of operation, the optical head 310 remains stationary throughout the entire operation of the optical system 300. The laser source 208 generates the light or laser beam 37 which impinges upon, and is reflected by the ridge 230. If the ridge 230 were not coated with a reflective layer 232 as is illustrated relative to the pit 227, then the light beam 37 is partly reflected or diffracted by the pit 227. The difference in the reflectivity of the light beam 37 by the coated and uncoated ridges 230 is therefore noticeably great and provides a clear reading of the recorded data bits.

The optical system 300 offers several advantages over existing systems. For instance, the optical system 300 eliminates the requirement for a focusing mechanism, thus reducing the number of components, simplifying the system manufacture and operation, improving its performance, and reducing its overall cost. In addition, since the optical head 310 and the disk 205 are stationary the system 300 is more stable and generates less noise thus optimizing the signal to noise ratio.

The various components of the optical system 300 will now be described in more details. FIG. 2 provides a cross-sectional view of the optical data storage medium or disk 205 according one embodiment of the present invention. The disk 205 includes a data substrate 240. The data substrate 240 may be made of any suitable material such as glass, polycarbonate or another suitable polymer material. An optional overercoat protective layer (not shown) may be formed on top of the data substrate 240. A suitable protective undercoat layer 243A is formed underneath the data substrate 240, to provide added mechanical support and protection. The undercoat layer 243, and/or the overcoat layer may be made for instance of aluminum nitride (AIN) or any other suitable material to provide adequate protection to the data substrate 240.

The data substrate 240 is patterned, for example by photoetching, to form the lands 220, 221, 222, 223, 224 and the pits 225, 226, 227, 228. Each land is generally flat. In one embodiment the lands are formed for instance by first patterning the data substrate 240 and then by removing regions of the data substrate 240, such as by photo-etching or other known techniques. In one embodiment all the lands are formed at the same or similar depth or distance relative to the surface 250 of the data substrate 240. It should however be clear that the pits may be formed at different depths relative to the surface 250. While the lands are illustrated to be flat, it should be clear that some or all of the lands may be non-planar or with roughened or patterned light incident surfaces.

The pits are regions that are embossed or raised relative to the adjacent lands. In one embodiment each pit is formed of an outer ridge, such as the ridge 230, which is angled relative to the adjacent land, i.e., 221, 222, 223. The angular disposition, that is the angle defined between the surface of the ridge 230 and the adjacent land 220 (i.e., approximately equal to "180°–$\Theta$", where the angle $\Theta$ may be set to, or exceeds a few degrees, such that the ridge 230 is substantially normal (i.e., perpendicular) to an incident laser beam 37.

In a preferred embodiment, the angles formed between the ridges 230 and the adjacent lands (or the data substrate surface 250) changes with the position of the tracks along which the pits are formed in order to maintain a substantially 90 degree angle with the incident optical beam 37. For instance, the angular disposition (i.e., approximately equal to "180°–$\Theta$") of the outermost pits along the outer diameter track (OD) is different than the angular disposition of the innermost pits along the inner diameter track (ID). In addition, the angular dispositions of the intermediate pits between the outer and inner diameter tracks (OD) and (ID), respectively, vary. For instance, in one embodiment the angular dispositions of the intermediate pits gradually and progressively increase between the angular dispositions of the outer and inner diameter tracks (OD) and (ID), respectively. In another embodiment all the pits 225, 226, 227, 228 are substantially similar in shape, dimensions and configuration.

The surface of the ridge 230 may be flat and smooth, or alternatively it may be roughened, so that when it is not coated with the reflective layer 232 the light beam is diffracted by the ridge 230, thus further increasing the difference in reflectivity of the laser beam 37 between the coated ridges and the uncoated ridges. The ridges 230 are selectively coated with reflective layers, such as 232, 236, 237 to record desired data bits. The reflective layers may be made of any suitable reflective material such as aluminum metal.

The reflective layers 232, 236, 237 have a generally flat reflective surface that is generally parallel to the ridge 230. As a result, when the incident laser beam 37 impinges upon the reflective layers 232, 236, 237 it is reflected along substantially the same optical path as the incident laser beam 37, back toward the optical head 310 where its intensity is detected and as it will be described later. The optical system 300 further includes a tracking control mechanism (not shown), which may utilize existing technology, such as a push-pull photodetector.

Referring now to the optical head 310, the laser source 208 emits a fine collimated beam preferably with a wavelength of less than 0.6 micron to 0.7 micron and a beam diameter of approximately 1 micron. Such a beam can be generated for instance by a soliton laser; a laser source using a self focusing medium or a nonlinear optical medium such as a photo-refractive crystal; or any other suitable light source that emits a fine collimated beam.

The beam steering element 210 causes a laser beam 37L from the laser source 208 to be swept optically across the entire (or alternatively across one or more selected segments) of the disk 205. This sweeping action is carried out using a holographic, an acousto-optical or a combination holographic/acousto-optical sweeping technique.

Figure 3:
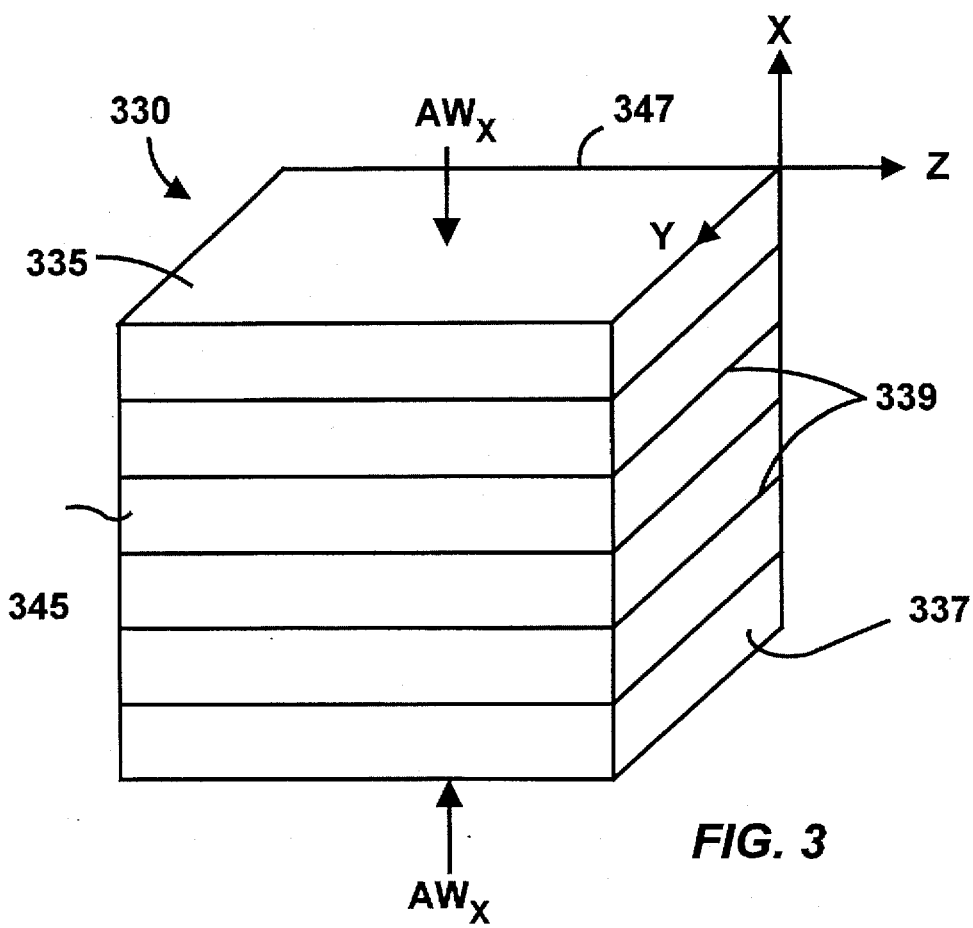
FIG. 3 is an enlarged perspective view of an acousto-optical crystal or photo-refractive crystal forming part of a beam steering element of the optical storage system of FIG's. 1 and 2, for controlling an optical beam deflection in the X direction.

One such acousto-optical sweeping technique according to the present invention will now be described in relation to FIG's. 3 through 6. FIG. 3 illustrates an acousto-optical crystal forming part of the beam steering element 210 of the optical storage system 300 of FIG's. 1 and 2, for controlling the sweeping or deflection of the optical or laser beam 37L emanating from the laser source 208, in an X direction.

Figure 4:
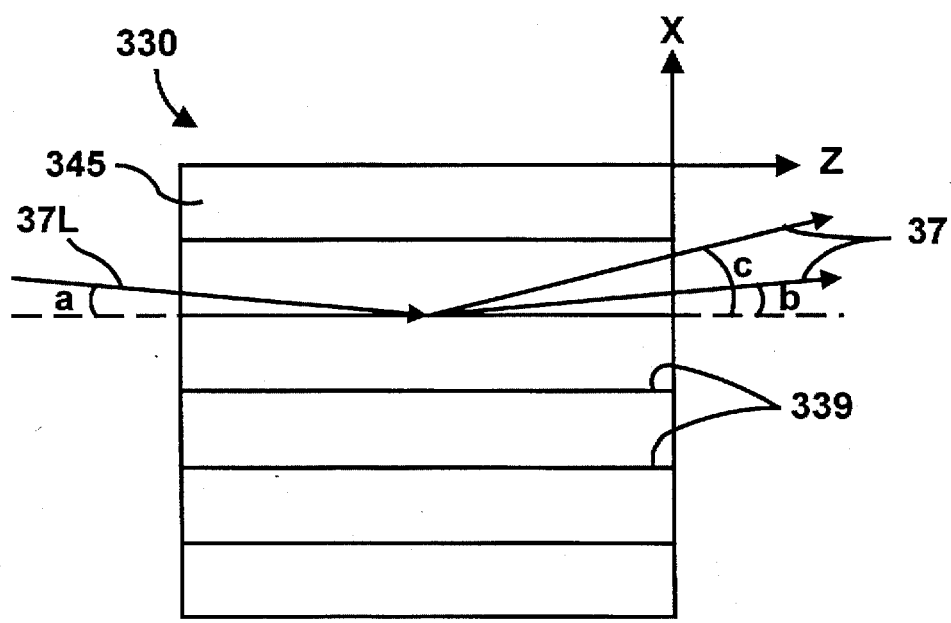
FIG. 4 is a front plan view of the acousto-optical crystal or photo-refractive crystal of FIG. 3.

A crystal 330 may be an elasto-optical crystal used in conjunction with the acousto-optical sweeping technique, or a photo-refractive crystal used in conjunction with the holographic sweeping technique. When the crystal 330 is an elasto-optic crystal as used in a Bragg cell, it may be composed for example of $LiNbO_3$. The acousto-optical crystal 330 deflects the laser beam 37L (FIG. 4). Two acoustic waves AWx have the same or substantially similar wavelength, intensity or amplitude, as they may originate from the same acoustic source and are thereafter split into two acoustic waves AWx.

The acoustic waves AWx impinge simultaneously upon the crystal 330 from two opposite sides 335, 337, along the X direction. The acoustic waves AWx are generally normal to the sides 335, 337. The acoustic waves AWx interfere and form an acoustic standing wave pattern (or grating) which is normal to the incident acoustic waves AWx. Due to the elasto-optic effect of the crystal 330, the optical refractive index "n" of the crystal 330 will be modulated by the interference pattern of the acoustic waves AWx.

The optical refractive index "n" depends on the density of the material forming the crystal 330, and results in an optical grating inside the crystal 330, which is referred to as an optic phase grating 339. The optic phase grating 339 includes patterns that are normal to the acoustic waves AWx, and causes the impinging optical beam 37L to be deflected in the X-direction as the optical beam 37.

As illustrated in FIG. 4, the optical beam 37L defines an angle of incidence "a" relative to the patterns of the optic phase grating 339, and the deflected optical beam 37 defines an angle of deflection "b" relative to the same patterns. By changing the wavelength of the acoustic waves AWx, the acoustic interference of the acoustic waves AWx changes, resulting in a corresponding change in the acoustic standing wave patterns and the optic phase grating 339, which ultimately causes the optical beam 37L to be deflected along a different deflection angle "c". Consequently, it is now possible to cause the optical beam 37 to be swept, and to scan the disk 205 in the X direction. The article titled "Scanning Beam Collimation Method for Measuring Dynamic Angle Variations Using an Acousto-Optic Deflector" by Lijiang Zeng, et al., 1662 Opt. Eng. 35(2) 1662–1663 (June 1996), which is incorporated herein by reference, describes general principles of acousto-optical techniques.

Figure 5:
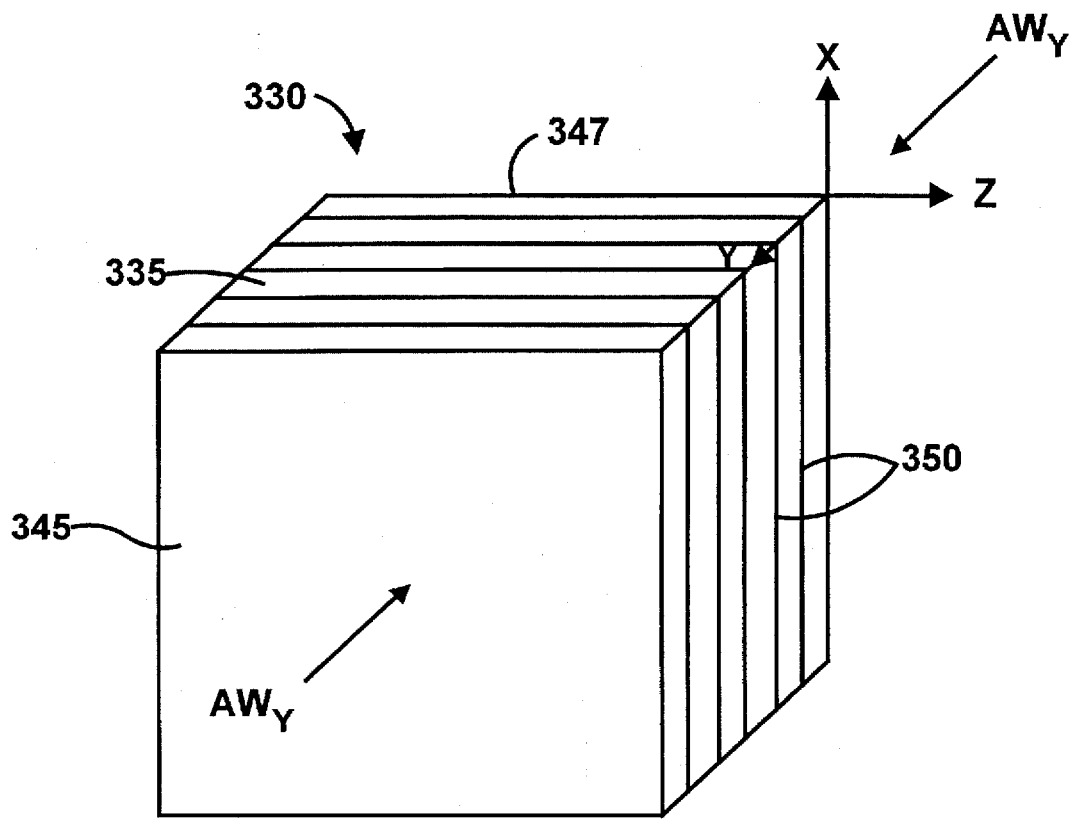
FIG. 5 is an enlarged perspective view of the acousto-optical crystal or photo-refractive crystal of FIG. 3, for controlling an optical beam deflection in the Y direction.

FIG. 5 illustrates a technique for controlling the sweeping or deflection of the optical or laser beam 37L in the Y direction. Two acoustic waves AWy have the same or substantially similar wavelength, intensity or amplitude, as they may originate from the same acoustic source and are thereafter split into two acoustic waves AWy.

The acoustic waves AWy impinge simultaneously upon the crystal 330 from two opposite sides 345, 347, along the Y direction. The acoustic waves AWy are generally normal to the sides 345, 347. The acoustic waves AWy interfere and form an acoustic standing wave pattern (or grating) which is normal to the incident the acoustic waves AWy. Due to the elasto-optic effect of the crystal 330, the optical refractive index "n" of the crystal 330 will be modulated by the interference pattern of the acoustic waves AWy.

The optical refractive index "n" results in an optic phase grating 350. The optic phase grating 350 includes patterns that are normal to the acoustic waves AWy. The optic phase grating 350 causes the impinging optical beam 37L to be deflected in the Y-direction as the optical beam 37.

Figure 6:
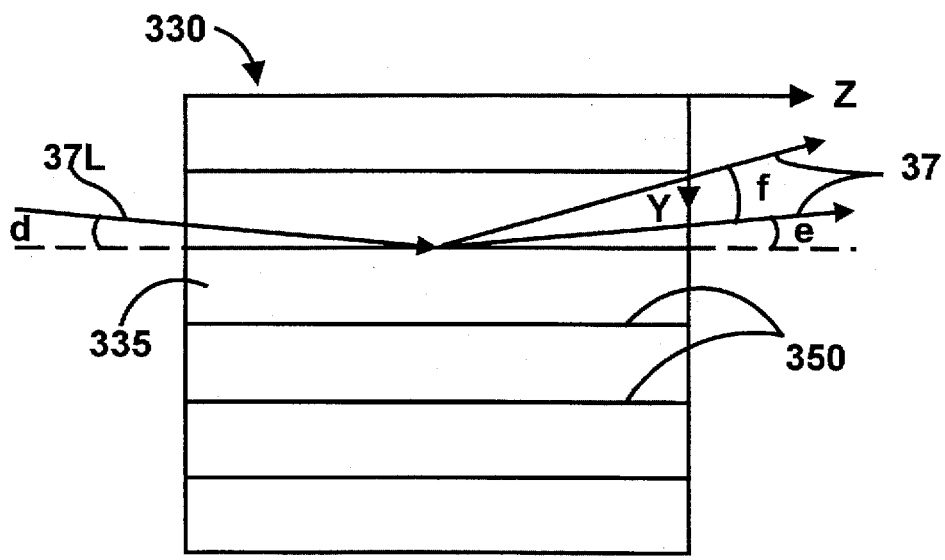
FIG. 6 is a top view of the acousto-optical crystal or photo-refractive crystal of FIG. 5.

As illustrated in FIG. 6, the optical beam 37L defines an angle of incidence "d" relative to the patterns of the optic phase grating 350, and the deflected optical beam 37 defines an angle of deflection "e" relative to the same patterns. By changing the wavelength of the acoustic waves AWy, the acoustic interference of the acoustic waves AWy changes, resulting in a corresponding change in the acoustic standing wave patterns and the optic phase grating 350, which ultimately causes the optical beam 37L to be deflected along a different deflection angle "f". Consequently, it is now possible to cause the optical beam 37 to be swept, and to scan the disk 205 in the Y direction.

The optical head 300 utilizes the crystal 330 and the acoustic waves Awx and AWy simultaneously, and includes a control circuit (not shown) that regulates the sweeping action, as desired along the plane containing the X and Y axes (2 dimensional sweeping).

The same or similar technique described above in relation to the acousto-optic sweeping method can be used as a holographic sweeping technique by replacing the acousto-optical crystal 330 with one or more photo-refractive crystals, for example $LiNbO_3$, $BaTiO_3$. The holographic grating inside the crystal 330 is then recorded by means of two coherent recording beams that impinge upon the crystal 330 from the same direction and that have the same wavelength. The laser beam 37L from the laser source 208 is deflected by the holographic grating, and, by changing the wavelength of the two coherent recording beams, the holographic grating changes accordingly, causing the resulting laser beam 37 to be steered between the outer and inner diameter tracks OD and ID, respectively, along the plane containing the X and Y axes, as desired. The following articles which are incorporated herein by reference describe general principles of holographic grating, recording, and deflecting techniques: "Optical Beam Deflection Using Dynamic Volume Reflection Gratings" in Optical and Quantum Electronics 21 (1989), pages 151–154; G. T. Sincerbox and G. Rosen, Applic. Opt. 22 (1983), 690; and J. P. Herriau, A. Delboulbe, J. P. Huignard, G. Rosen, and G. Pauliat, IEEE J. Lightwave Technol. LT-4 (1986) 905, all of which are incorporated herein by reference.

Referring now to FIG. 2, the incident beam 37, or a part thereof is reflected by either the reflective layer 232 or the uncoated ridge 230, back toward the optical head 310 and impinges upon the beam splitter 212. The beam splitter 212 separates the incident beam 37 and the beam reflected by the disk 205, and deflects the reflected beam into a beam 37D which is detected by the photo-detector 214. The photo-detector 214 detects the intensity of the deflected laser beam 37D. If the intensity of the deflected beam 37D were greater than a predetermined level, the optical head 310 determines that the incident laser beam 37 was reflected by a ridge 230 with a reflective layer 232, and as a result reads a predetermined data bit, such as a "1". If on the other hand the intensity of the deflected beam 37D is less than a predetermined level, the optical head 310 determines that the incident laser beam 37 was not reflected by a ridge 230 with a reflective layer 232, and as a result reads a predetermined data bit, such as a "0".

Figure 8:
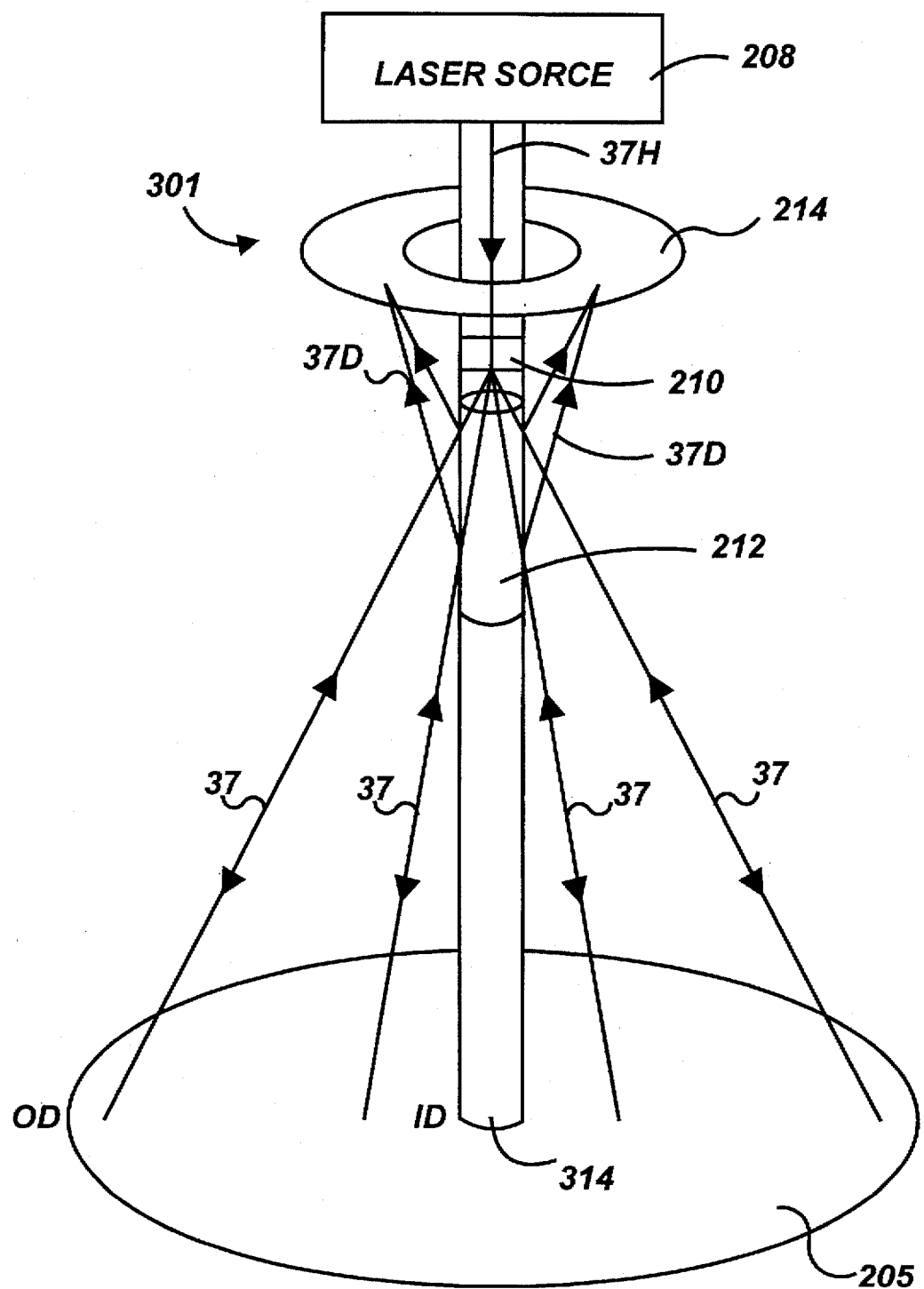
FIG. 8 is a schematic view of the optical data storage system illustrating additional structural details.

Reference is now made to FIG. 8, which illustrates one structural embodiment of the optical head 301. The axle 314 is stationary, cylindrically shaped, and passes through an opening in the geometric center of the disk 205. The beam splitter 212 is secured co-axially on top of, and relative to the axle 314. The beam splitter 212 is preferably cylindrically shaped and is hollow throughout its axial length. The beam splitter 212 has a reflective surface which is at least partly transmissive (or transparent) to the beam 37H from emanating from the laser source 208, and is at least partly reflective of the laser beam 37 reflected back from the disk (205) surface.

The crystal forming part of the beam steering element 210 is mounted in proximity to the beam splitter 212, co-axially relative to the axle 314. The photo-redetector 214 includes a photo-detector ring which fits co-axially relative to the axis of the axle 314.

The operation of the optical head 301 will now be described in more detail. The laser source emits the laser beam 37H which passes through the photo-detector ring 214 and impinges upon the beam steering element 210. The laser beam 37H is steered as described herein and passes through the beam splitter 212 which is at least partly transmissive to the laser beam 37H. The steered laser beam 37 impinges onto the disk 205 and is reflected back toward the splitter 212. The splitter 212 reflects the beam 37 off its outer surface into the beam 37D, toward the photo-detector ring 214. The beam 37D impinges upon or is captured by the photo-detector ring 214 for processing.

With reference to FIG. 1, the optical system 300 may include another optical head 310A positioned below or above the disk 205 on a convenient structure such as the platform 26. In addition, the optical head 310 may be positioned below the disk 205 so that the optical head 300 may now read data from a lower surface 252 of the disk 205 as well as an upper surface 251 of the disk 205. In such an embodiment the upper surface 251 and the lower surface 252 are patterned with lands and pits as described herein.

While the optical system 300 has been described as being stationary, it should be clear that the disk 205 may be rotatably secured to the chassis 18. Alternatively or additionally, the optical head 310 may be movable or adjustable along the axle 314, the platform 26, or any other structure on which it is mounted. Furthermore, while the optical head 310 is described as being mounted above the disk 205, the optical head 310 may be located underneath the disk 205.

For example, the optical system 300 may include one or two optical heads 310, 310A that are capable of translating up and down vertically. In another embodiment the platform 26 may translate laterally. In yet another embodiment one or both optical heads 310, 310A are capable of sliding vertically, and the platform 26 is capable of translating laterally.

In still another embodiment, the reflective layers 232, 236 are not necessarily flat and may be concave or convex, so long as the incident laser beam 37 is reflected generally back toward the optical 310 to be detected thereby. In a further embodiment the laser source 208 and the laser steering element 210 are disposed remotely from the beam splitter 212 and photo-detector 214 so that the incident laser beam 37 is not necessarily normal to the reflective layers 232, 236 provided the reflected laser beam impinges upon the beam splitter 212 for detection by the photo-detector 214.

In another embodiment the optical system 300 further includes an optional isolator 255 positioned between the laser source 208 and the beam steering element 210 so as to attenuate any residual laser beam which is reflected back to the laser source 208.

In still another embodiment the beam steering function is carried out holographically as well as by means of acousto-optical methods. In such a design, the laser beam 37L from the laser source 208 is first deflected using the acousto-optical method described herein, and the reflected laser beam is further deflected using the holographic technique described herein. Such double deflection will permit the optical head 310 to be positioned in closer proximity to the disk 205.

Figure 7:
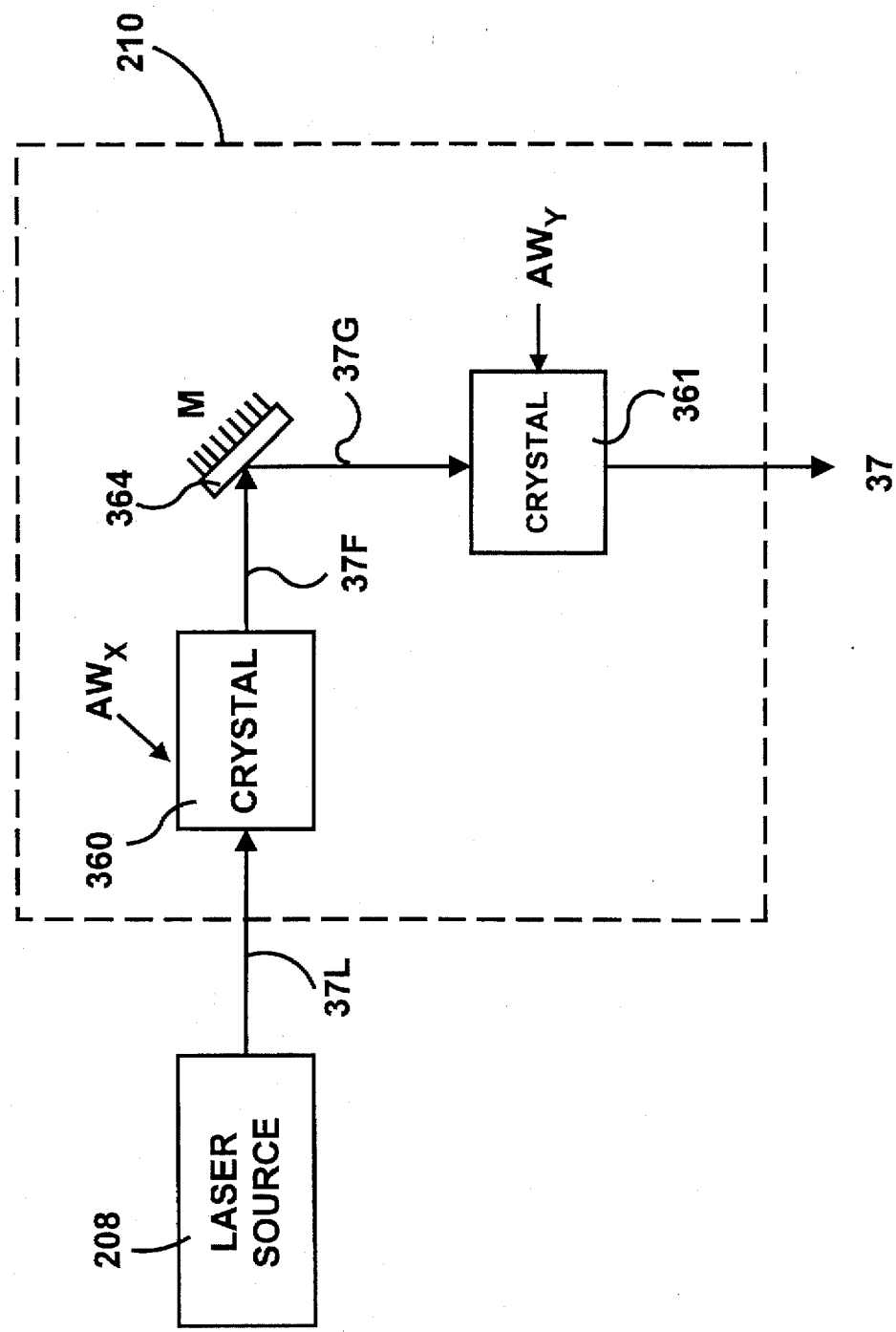
FIG. 7 is a schematic view of an alternative beam steering element of the optical storage system of FIG's. 1 and 2, for controlling the optical beam deflection in the X and Y directions.

Referring now to FIG. 7 it illustrates an alternative beam steering element 210 which utilizes two separate acousto-optical crystals 360, 361 and a reflective mirror 364. The acousto-optical crystal 360 causes the optical beam 37L to be deflected along the X direction in an optical beam 37F, as explained herein. The mirror 364 reflects the optical beam 37F in the direction of the acousto-optical crystal 361. The acousto-optical crystal 361 causes the optical beam 37L to be deflected along the Y direction as explained herein.

It should be understood that the geometry, compositions, and dimensions described herein may be modified within the scope of the invention. For instance, the inventive concept of the present invention may be extended to optical and magneto-optical media with multiple data layers. Furthermore, the optical head 310 may alternatively or additionally be moved pivotally. Other modifications may be made when implementing the invention for a particular environment.

What is claimed is:

1. An optical data storage system for use with a stationary data storage medium, the system comprising in combination:

stationary optical head for steering an optical beam using an acousto-optical method across the data storage medium; and said optical head including:

an optical source for generating said optical beam;

a beam steering element for steering said optical beam; and a photo-detector for detecting the relative intensity of said deflected optical beam for determining the type of recorded data bits;

said beam steering element including an acousto-optical crystal for controlling the bidirectional sweeping of said optical beam;

wherein said acoustic-optical crystal is an elasto-optic crystal;

wherein said optical beam is a coherent laser beam having a predetermined wavelength;

wherein said beam steering element further generates two acoustic waves (AWx) having a substantially similar wavelength, intensity and amplitude, that impinge simultaneously upon said elasto-optic crystal from two opposite sides along an X direction to form an interference pattern which is normal to said acoustic waves; and wherein due to an elasto-optic effect of said crystal, an optical refractive index "n" of said elasto-optic crystal is modulated by said interference pattern of said acoustic waves.

2. The system according to claim 1, wherein said optical refractive index "n" results in an optic phase grating inside said elasto-optic crystal; and wherein said optic phase grating causes said optical beam to be deflected in the X direction.

3. The system according to claim 2, wherein said beam steering element further generates two acoustic waves (AWy) having a substantially similar wavelength, intensity and amplitude, that impinge simultaneously upon said elasto-optic crystal from two opposite sides along a Y direction to form an interference pattern which is normal to the incident acoustic waves;

wherein due to an elasto-optic effect of said crystal, an optical refractive index "n" of said elasto-optic crystal is modulated by said interference pattern of said acoustic waves;

wherein said optical refractive index "n" results in an optic phase grating inside said elasto-optic crystal; and wherein said optic phase grating causes said optical beam to be deflected in the Y direction.

4. The system according to claim 2, wherein said laser beam is deflected by said elasto-optic crystal by changing said wavelength of said acoustic waves AWx, for controlling the steering of said laser beam across the data storage medium in the X direction.

5. The system according to claim 4, wherein said laser beam is deflected by said elasto-optic crystal by changing said wavelength of said acoustic waves AWy, for controlling the steering of said laser beam across the data storage medium in the Y direction.

6. An optical data storage system for use with a stationary data storage medium, the system comprising in combination:

a stationary optical head for steering an optical beam using an acousto-optical method across the data storage medium; and said optical head including:

an optical source for generating said optical beam;

a beam steering element for steering said optical beam; and a photo-detector for detecting the relative intensity of said deflected optical beam for determining the type of recorded data bits;

said beam steering element including an acousto-optical crystal for controlling the bidirectional sweeping of said optical beam;

a beam splitter which is generally hollow and cylindrically shaped, and is secured coaxially relative to the storage medium; and wherein said photo-detector includes a photo-detector ring which fits co-axially relative to said beam splitter, for capturing an optical beam reflected off said beam splitter.

7. An optical data storage system for use with a stationary data storage medium, the system comprising in combination:

a stationary optical head for steering an optical beam holographically across the data storage medium; and said optical head including;

a light source for emitting a collimated optical beam;

a beam steering element for steering said optical beam;

a photo-detector for detecting the relative intensity of said optical beam reflected from the storage medium for determining the type of recorded data bits;

said beam steering element including a photo-refractive crystal for controlling the sweeping of said optical beam in X and Y directions;

wherein said optical beam is a coherent laser beam;

wherein said laser beam steering element includes a holographic crystal containing a holographic grating; and wherein said holographic grating is recorded by means of two coherent recording beams each having a predetermined wavelength; and wherein said laser beam is deflected by said holographic grating by changing said wavelength of said two coherent recording beams for causing said laser beam to be steered across the data storage medium.

8. The system according to claim 7, wherein said laser beam is deflected by the optical medium; and wherein if a relative intensity of said reflected laser beam exceeds a predetermined level, said optical head determines the presence of a first data bit.

9. The system according to claim 8, wherein if the relative intensity of said reflected laser beam falls below a predetermined level, said optical head determines the presence of a second data bit.

10. An optical data storage system for use with a stationary data storage medium, the system comprising in combination:

a stationary optical head for steering an optical beam using an acousto-optical method across the data storage medium; and said optical head including:

an optical source for generating said optical beam;

a beam steering element for steering said optical beam; and a photo-detector for detecting the relative intensity of said deflected optical beam for determining the type of recorded data bits;

said beam steering element including an acousto-optical crystal for controlling the bidirectional sweeping of said optical beam;

wherein the data storage medium includes an upper surface and a lower surface;

wherein said optical head is positioned below said lower surface of the data storage medium; and wherein said optical system further includes a second optical head positioned above said upper surface of the data storage medium.

11. An optical data storage system for use with a stationary data storage medium, the system comprising in combination:

a stationary optical head for steering an optical beam using an acousto-optical method across the data storage medium; and said optical head including:

an optical source for generating said optical beam;

a beam steering element for steering said optical beam; and a photo-detector for detecting the relative intensity of said deflected optical beam for determining the type of recorded data bits; said beam steering element including an acousto-optical crystal for controlling the bidirectional sweeping of said optical beam;

wherein the data storage medium includes an innermost diameter track, an outermost diameter track, and a pattern of intermediate tracks therebetween; and wherein said optical beam is selectively swept between said innermost diameter track, said outermost diameter track, and said pattern of intermediate tracks by steering said laser beam.

12. An optical data storage system for use with a stationary data storage medium, the system comprising in combination:

a stationary optical head for steering an optical beam holographically across the data storage medium; and said optical head including:

a light source for emitting a collimated optical beam;

a beam steering element for steering said optical beam;

a photo-detector for detecting the relative intensity of said optical beam reflected from the storage medium for determining the type of recorded data bits;

said beam steering element including a photo-refractive crystal for controlling the sweeping of said optical beam in X and Y directions; and a beam splitter which is generally hollow and cylindrically shaped, and is secured co-axially relative to the storage medium; and wherein said photo-detector includes a photo-detector ring which fits co-axially relative to said beam splitter, for capturing an optical beam reflected off said beam splitter.

13. An optical data storage system for use with a stationary data storage medium, the system comprising in combination:

a stationary optical head for steering an optical beam holographically across the data storage medium; and said optical head including:

a light source for emitting a collimated optical beam;

a beam steering element for steering said optical beam;

a photo-detector for detecting the relative intensity of said optical beam reflected from the storage medium for determining the type of recorded data bits;

said beam steering element including a photo-refractive crystal for controlling the sweeping of said optical beam in X and Y directions; and wherein the data storage medium includes an upper surface and a lower surface;

wherein said optical head is positioned below said lower surface of the data storage medium; and wherein said optical system further includes a second optical head positioned above said upper surface of the data storage medium.

14. An optical data storage system for use with a stationary data storage medium, the system comprising in combination:

a stationary optical head for steering an optical beam holographically across the data storage medium; and said optical head including:

a light source for emitting a collimated optical beam;

a beam steering element for steering said optical beam;

a photo-detector for detecting the relative intensity of said optical beam reflected from the storage medium for determining the type of recorded data bits;

said beam steering element including a photo-refractive crystal for controlling the sweeping of said optical beam in X and Y directions; and wherein the data storage medium includes an innermost diameter track, an outermost diameter track, and a pattern of intermediate tracks therebetween; and wherein said optical beam is selectively swept between said innermost diameter track, said outermost diameter track, and said pattern of intermediate tracks by steering said laser beam.

15. An optical data storage system according to claim 6, wherein said beam steering element includes a first acousto-optical crystal for controlling the sweeping of said optical beam in an X direction, and a second acousto-optical crystal for controlling the sweeping of said optical beam in a Y direction.

16. The optical data storage system according to claim 6, wherein said beam steering element further generates two acoustic waves (AWx) having a substantially similar wavelength, intensity and amplitude, that impinge simultaneously upon said elasto-optic crystal from two opposite sides along an X direction to form an interference pattern which is normal to said acoustic waves; and wherein due to an elasto-optic effect of said crystal, an optical refractive index "n" of said elasto-optic crystal is modulated by said interference pattern of said acoustic waves.

17. The system according to claim 16, wherein said optical refractive index "n" results in an optic phase grating inside said elasto-optic crystal; and wherein said optic phase grating causes said optical beam to be deflected in the X direction.

18. The system according to claim 6, wherein said beam steering element further generates two acoustic waves (AWy) having a substantially similar wavelength, intensity and amplitude, that impinge simultaneously upon said elasto-optic crystal from two opposite sides along a Y direction to form an interference pattern which is normal to the incident acoustic waves;

wherein due to an elasto-optic effect of said crystal, an optical refractive index "n" of said elasto-optic crystal is modulated by said interference pattern of said acoustic waves;

wherein said optical refractive index "n" results in an optic phase grating inside said elasto-optic crystal; and wherein said optic phase grating causes said optical beam to be deflected in the Y direction.

19. An optical data storage system according to claim 10, wherein said beam steering element includes a first acousto-optical crystal for controlling the sweeping of said optical beam in an X direction, and a second acousto-optical crystal for controlling the sweeping of said optical beam in a Y direction.

20. The optical data storage system according to claim 10, wherein said beam steering element further generates two acoustic waves (AWx) having a substantially similar wavelength, intensity and amplitude, that impinge simultaneously upon said elasto-optic crystal from two opposite sides along an X direction to form an interference pattern which is normal to said acoustic waves; and wherein due to an elasto-optic effect of said crystal, an optical refractive index "n" of said elasto-optic crystal is modulated by said interference pattern of said acoustic waves.

21. The system according to claim 20, wherein said optical refractive index "n" results in an optic phase grating inside said elasto-optic crystal; and wherein said optic phase grating causes said optical beam to be deflected in the X direction.

22. The system according to claim 19, wherein said beam steering element further generates two acoustic waves (AWy) having a substantially similar wavelength, intensity and amplitude, that impinge simultaneously upon said elasto-optic crystal from two opposite sides along a Y direction to form an interference pattern which is normal to the incident acoustic waves;

wherein due to an elasto-optic effect of said crystal, an optical refractive index "n" of said elasto-optic crystal is modulated by said interference pattern of said acoustic waves;

wherein said optical refractive index "n" results in an optic phase grating inside said elasto-optic crystal; and wherein said optic phase grating causes said optical beam to be deflected in the Y direction.

23. An optical data storage system according to claim 11, wherein said beam steering element includes a first acousto-optical crystal for controlling the sweeping of said optical beam in an X direction, and a second acousto-optical crystal for controlling the sweeping of said optical beam in a Y direction.

24. The optical data storage system according to claim 11, wherein said beam steering element further generates two acoustic waves (AWx) having a substantially similar wavelength, intensity and amplitude, that impinge simultaneously upon said elasto-optic crystal from two opposite sides along an X direction to form an interference pattern which is normal to said acoustic waves; and wherein due to an elasto-optic effect of said crystal, an optical refractive index "n" of said elasto-optic crystal is modulated by said interference pattern of said acoustic waves.

25. The system according to claim 24, wherein said optical refractive index "n" results in an optic phase grating inside said elasto-optic crystal; and wherein said optic phase grating causes said optical beam to be deflected in the X direction.

26. The system according to claim 11, wherein said beam steering element further generates two acoustic waves (AWy) having a substantially similar wavelength, intensity and amplitude, that impinge simultaneously upon said elasto-optic crystal from two opposite sides along a Y direction to form an interference pattern which is normal to the incident acoustic waves;

wherein due to an elasto-optic effect of said crystal, an optical refractive index "n" of said elasto-optic crystal is modulated by said interference pattern of said acoustic waves;

wherein said optical refractive index "n" results in an optic phase grating inside said elasto-optic crystal; and wherein said optic phase grating causes said optical beam to be deflected in the Y direction.

27. The optical data storage system according to claim 12, wherein said optical beam steering element includes a holographic crystal containing a holographic grating; and wherein said holographic grating is recorded by means of two coherent recording beams each having a predetermined wavelength.

28. The system according to claim 27, wherein said optical beam is deflected by said holographic grating by changing said wavelength of said two coherent recording beams for causing said optical beam to be steered across the data storage medium.

29. The system according to claim 12, wherein said optical beam is deflected by the optical medium;

wherein if a relative intensity of said reflected optical beam exceeds a predetermined level, said optical head determines the presence of a first data bit; and wherein if the relative intensity of said reflected laser beam falls below a predetermined level, said optical head determines the presence of a second data bit.

30. The optical data storage system according to claim 13, wherein said optical beam steering element includes a holographic crystal containing a holographic grating; and wherein said holographic grating is recorded by means of two coherent recording beams each having a predetermined wavelength.

31. The system according to claim 30, wherein said optical beam is deflected by said holographic grating by changing said wavelength of said two coherent recording beams for causing said optical beam to be steered across the data storage medium.

32. The system according to claim 13, wherein said optical beam is deflected by the optical medium;

wherein if a relative intensity of said reflected optical beam exceeds a predetermined level, said optical head determines the presence of a first data bit; and wherein if the relative intensity of said reflected laser beam falls below a predetermined level, said optical head determines the presence of a second data bit.

33. The optical data storage system according to claim 14, wherein said optical beam steering element includes a holographic crystal containing a holographic grating; and wherein said holographic grating is recorded by means of two coherent recording beams each having a predetermined wavelength.

34. The system according to claim 33, wherein said optical beam is deflected by said holographic grating by changing said wavelength of said two coherent recording beams for causing said optical beam to be steered across the data storage medium.

35. The system according to claim 14, wherein said optical beam is deflected by the optical medium;

wherein if a relative intensity of said reflected optical beam exceeds a predetermined level, said optical head determines the presence of a first data bit; and wherein if the relative intensity of said reflected laser beam falls below a predetermined level, said optical head determines the presence of a second data bit.

* * * * *